Patented Aug. 18, 1931

1,819,547

UNITED STATES PATENT OFFICE

HEINZ EICHWEDE AND ERICH FISCHER, OF HOCHST-ON-THE-MAIN, GERMANY, ASSIGNORS TO GENERAL ANILINE WORKS, INC., OF NEW YORK, N. Y., A CORPORATION OF DELAWARE

AZO DYESTUFF FROM SULPHOARYL-3-CARBOXYLIC ACID ESTER-5-PYRAZOLONES

No Drawing. Application filed November 9, 1925, Serial No. 68,025, and in Germany November 27, 1924.

The present invention relates to azo dyestuffs from sulphoaryl-3-carboxylic acid ester-5-pyrazolones and material dyed therewith.

We have found that valuable dyestuffs are obtained by coupling any aromatic diazo compounds with such sulfopyrazolone-derivatives as are derived from the general formula:

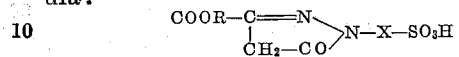

wherein R stands for an alkyl residue and X for an aromatic nucleus, its homologues or its substitution products. The new dyestuffs dye wool even and pure tints of excellent properties as to fastness.

If as diazo component is used anthranilic acid, ortho-aminophenol or derivatives of these compounds, the dyestuffs prepared therewith and the dyeings obtainable therefrom can be developed in the usual manner by afterchroming them.

The sulfopyrazolonecarboxylic acid esters, which have not yet been described or used for coupling-purposes may, for instance, be prepared by heating in an aqueous solution the hydrazones obtained from the corresponding X-hydrazinesulfonic acids (X standing for an aromatic nucleus, its homologues or substitution products) and oxalacetic ester, or by allowing them to stand for some hours in the cold in a solution rendered slightly alkaline by sodium carbonate, whereby the formation of the pyrazolone by the closure of the ring is effected without there being any saponification of the carboxylic ester group.

The new dyestuffs may also be prepared, but in a less practical way, by subsequently esterifying the dyestuffs, obtainable from diazo compounds and sulfopyrazolonecarboxylic acids, in the carboxyl group.

The following examples serve to illustrate our invention, the parts being by weight:

(1) 312 parts of 1-(4'-sulfophenyl)-5-pyrazolone-3-carboxylic acid ethylester are dissolved in the cold in about 2000 parts of water and the equivalent quantity of sodium carbonate; to this solution are added 180 parts of crystallized sodium acetate and into the resulting solution is run a diazo solution obtained in the usual manner from 121 parts of m-aminobenzaldehyde; the dyestuff thus formed is salted out, filtered and dried. It forms a yellow powder which is readily soluble in water and dyes wool very even beautiful yellow tints of excellent fastness to light.

The composition of the dyestuff formed according to this example may be represented by the following structural formula:

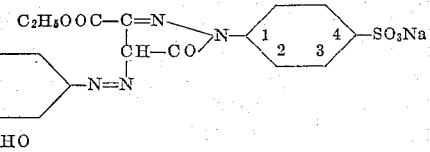

(2) 312 parts of 1-(4'-sulfophenyl)-5-pyrazolone-3-carboxylic acid ethylester are first treated as indicated in Example 1 and then coupled with a diazo solution from 128 parts of orthochloroaniline whereby the dyestuff is formed. After having stirred the whole for one to two hours the dyestuff thus obtained is entirely separated by the addition of a small quantity of a solution of common salt. After having filtered and dried, the dyestuff is obtained as an orange powder which readily dissolves in water and dyes wool a very even reddish-yellow tint of very good properties as to fastness.

(3) 312 parts of 1-(4'-sulfophenyl)-5-pyrazolone-3-carboxylic acid ethylester are coupled in the manner described in Examples 1 and 2 while adding some acetate with a diazo suspension obtained from 173 parts of sulfanilic acid whereby the dyestuff is formed. This dyestuff, after having been separated in the manner indicated in Example 1, dyes wool a beautiful, even reddish-yellow tint of excellent properties as to fastness.

(4) 312 parts of 1-(4'-sulfophenyl)-5-pyrazolone-3-carboxylic acid ethylester are first treated as indicated in Example 1 while adding some acetate. Into the solution so obtained is run the diazo solution obtained in the usual manner from 182 parts of 5-nitro-2-aminobenzoic acid. After the whole of the diazo solution is added, a dilute solution of sodium carbonate is slowly introduced into the coupling mixture until the mass shows a neutral reaction. After having allowed the mass to stand for some hours the resulting coloring matter is separated by addition of common salt. The dyestuff dyes wool a beautiful yellowish-orange tint which by afterchroming becomes orange-brown and possesses excellent properties as to fastness.

(5) 312 parts of 1-(4'-sulfophenyl)-5-pyrazolone-3-carboxylic acid ethylester are coupled according to the procedure indicated in Examples 1 to 3 with a diazo solution obtained in the usual manner from 199 parts of picramic acid, whereby the dyestuff is formed. The dyestuff, after having been separated by adding common salt and dried, constitutes a reddish-brown powder and dyes wool a red tint which by afterchroming becomes reddish-brown.

(6) 360 parts of 1-(2'-methyl-6'-chloro-4'-sulfophenyl)-5-pyrazolone-3-carboxylic acid ethylester are treated according to the procedure indicated in Example 1, and then coupled with a diazo solution obtained in the usual manner from 93 parts of aniline, whereby the coloring matter is formed; by adding a small quantity of common salt the dyestuff is completely separated. It dyes wool a very even, yellow tint of excellent properties as to fastness.

(7) the dyestuff from 6-chloro-1-aminobenzene-3-sulfonic acid → 1 (2'-methyl-6'-chloro-4'-sulfophenyl)-5-pyrazolone-3-carboxylic acid ethylester is prepared according to the procedure indicated in the above examples by coupling 360.5 parts of sulfophenyl-pyrazolone carboxylic acid ethylester with the diazo compound obtained from 207.5 parts of 6-chloro-1-aminobenzene-3-sulfonic acid. From the resulting clear solution the dyestuff is separated by mixing and stirring it for a prolonged time with a small quantity of common salt. The dyestuff thus obtained dyes wool very even yellow tints.

The composition of the dyestuff formed according to this example may be represented by the following structural formula:

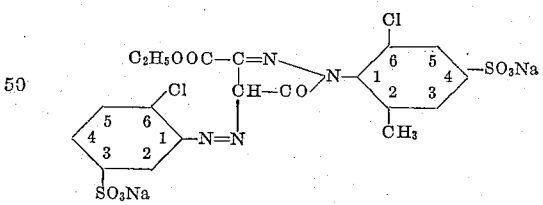

For the diazo compounds specified in Examples 1 to 7 there may be substituted any other diazo compounds. For instance there may be used with the same result the diazo compounds of the following bases:

Ortho- or meta- or para toluidine.
Para- or meta-chloraniline.
The chlorotoluidine series.
The xylidine series.
Ortho- or meta- or para-aminobenzoic acid methylester or ethylester.
Nitro-aminobenzoic acid ester.
Meta-aminobenzoic acid anilide.
Meta-aminoanisic acid anilide.
Aminotriphenylmethane.
Ortho- amino-phenol and its substitution products.

The isomerides, homologues and substitution products of sulfanilic acid such for instance as:
Ortho-aniline sulfonic acid.
Metanilic acid.
Chloranilinesulfonic acids and nitranilinesulfonic acids.
Toluidinic acids.
Xylidinesulfonic acids, etc.

Valuable disazo-dyestuffs may also be obtained by using the following compounds:
Diaminotriphenylmethane.
Diamino-diphenyl-dimethylmethane.
Di-ortho-tolyl-dimethylmethane.
2.2'-tolidine.
2.2'-dichlorbenzidine.
Diphenyline or the like.

The 1-(4'-sulfophenyl)-5-pyrazolone-3-carboxylic acid ethylester and the 1-(2'-methyl-6'-chloro-4'-sulfophenyl)-5-pyrazolone-3-carboxylic acid ethylester may be replaced by any other sulfophenyl-5-pyrazolone-3-carboxylic acid esters, for instance: 1-(2'-5'-dichloro-4'-sulfophenyl)-5-pryazolone-3-carboxylic acid methyl- or ethyl-ester; 1-(2'-sulfophenyl)-5-pryazolone-3-carboxylic acid methyl- or ethyl-ester; 1-(2'-chloro-5'-sulfophenyl)-5-pyrazolone-3-carboxylic acid methyl- or ethyl ester; 1-(2'-hydroxy-3'-carboxy-5'-sulfophenyl)-5-pyrazolone-3-carboxylic acid methyl- or ethyl ester or the like.

The process for preparing the sulfophenyl-pyrazolone-carboxylic acid methyl or ethyl ester may, for instance, be carried out as follows:

(8) 188 parts of para-sulfophenylhydrazine are suspended in 1000 parts of water; to this suspension are added 230 parts of the sodium salt of oxalacetic ester and the whole is allowed to stand in the cold for about 1 hour. The mixture is then gradually heated to boiling. After having done so for about 1 to 2 hours, the solution begins to bump and to separate crystals. There is then added so much of water that a clear solution is again formed in the heat which is then kept boiling for another 1 to 2 hours. On cooling, the sulfo-pyrazolone-carboxylic acid methyl or ethyl ester crystallizes out; by adding a dilute acid there may be obtained from the mother liquor a further quantity of the ester. The product so obtained can be purified by recrystallization from water forming then a white powder. Accordingly as there is used oxalacetic ethyl ester or oxalacetic methyl ester 1-(4'-sulfophenyl)-5-pyrazolone-3-carboxylic acid ethyl ester and 1-(4'-sulfophenyl)-5-pyrazolone-3-carboxylic acid methylester respectively are obtained.

(9) 236.5 parts of 2-methyl-6-chloro-4-sulfophenyl-1-hydrazine are mixed at ordinary temperature with 600 parts of water and 230 parts of the sodium salt of oxalacetic ethyl ester and this mixture is heated for about ½ hour to 40-50° C.; on cooling, the hydrazone which is formed crystallizes out after some time; this hydrazone is preferably isolated, introduced while stirring, into about 1000 parts of water and mixed with an equivalent quantity of a sodium carbonate solution and the alkaline suspension thus produced is allowed to stand in the cold for about 10 to 12 hours. The solution so obtained, which if desired may be purified by filtration, can be directly used for the preparation of the dyestuff.

The course of the above reaction is illustrated by the following equation:

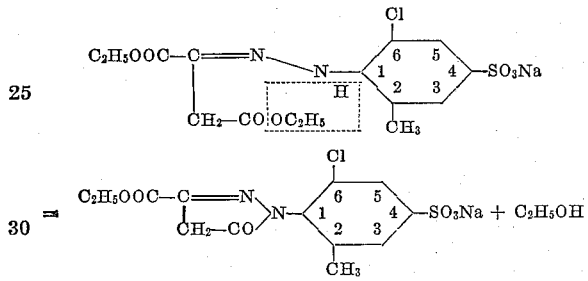

As regards the preparation of the esters, we would add that, when industrially making them, it is not necessary to isolate the sodium salt of the oxalacetic acid, but it suffices to introduce the hydrazine paste, while stirring, into the solution of the sodium salt of oxalacetic ester in benzene obtained during the manufacturing process; in this case the benzene is subsequently distilled off and the dyestuff worked up as indicated in the foregoing examples.

We claim:

1. As a new product the azo dyestuff of the formula:

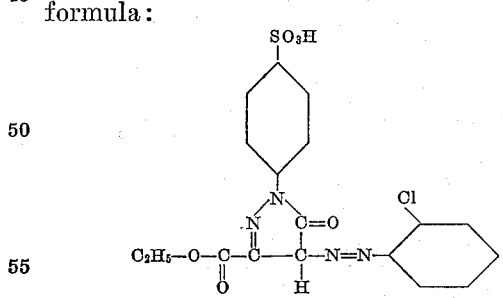

which dyes wool an even reddish yellow tint of excellent fastness to light.

2. As new products, azo dyestuffs of the general formula:

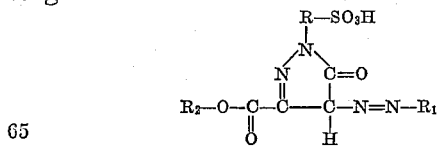

wherein R and $R_1$ stand for a benezene or naphtralene residue, $R_2$ stands for $CH_3$ or $C_2H_5$, which dye wool even red to yellow tints of excellent fastness to light.

3. As new products, azo dyestuffs of the general formula:

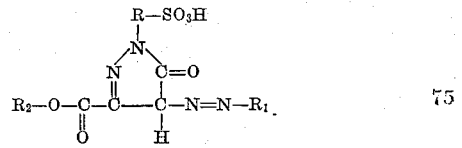

wherein R represents a benzene nucleus which may be substituted by alkyl, or halogen, $R_1$ stands for a benzene or naphthalene residue, and $R_2$ for $CH_3$ or $C_2H_5$, which dye wool even red to yellow tints of excellent fastness to light.

4. As new products, azo dyestuffs of the general formula:

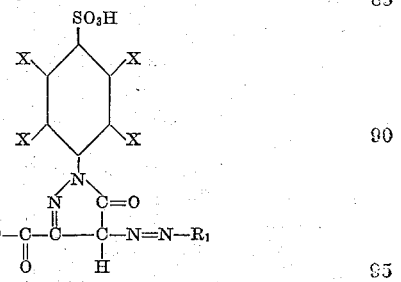

wherein $R_1$ stands for a benzene or naphthalene residue, $R_2$ for $CH_3$ or $C_2H_5$ and one X for H or Cl, one X for H or $CH_3$, the other X's for H, which dye wool even red to yellow tints of excellent fastness to light.

5. As new products, azo dyestuffs of the general formula:

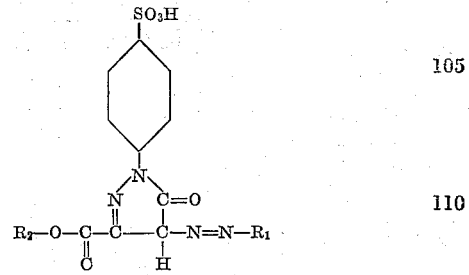

wherein $R_1$ stands for a benzene or naphthalene residue and $R_2$ for $CH_3$ or $C_2H_5$, which dye wool even red to yellow tints of excellent fastness to light.

6. As new products, azo dyestuffs of the general formula:

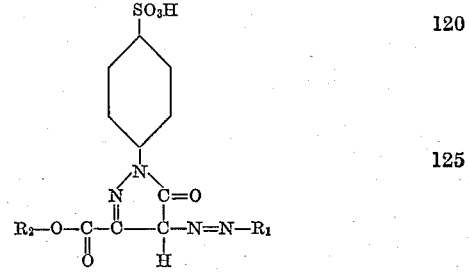

wherein $R_1$ stands for a benzene nucleus which may be substituted by halogen alkyl, O-alkyl, CHO, carboxyl or a sulfogroup and $R_2$ for $CH_3$ or $C_2H_5$, which dye wool even red to yellow tints of excellent fastness to light.

7. As new dyestuffs, azo dyestuffs of the general formula:

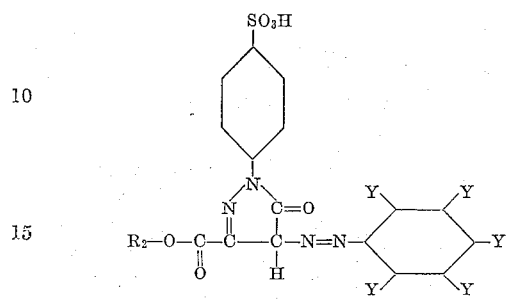

wherein $R_2$ stands for $CH_3$ or $C_2H_5$, one Y stands for Cl or $CH_3$, the others for H, which dye wool even red to yellow tints of excellent fastness to light.

8. Material dyed with a dyestuff as claimed in claim 2.

9. Material dyed with a dyestuff as claimed in claim 3.

10. Material dyed with a dyestuff as claimed in claim 4.

11. Material dyed with a dyestuff as claimed in claimed 5.

12. Material dyed with a dyestuff as claimed in claim 6.

13. Material dyed with a dyestuff as claimed in claim 7.

14. Material dyed with the dyestuff as claimed in claim 1.

In testimony whereof, we affix our signatures.

HEINZ EICHWEDE.
ERICH FISCHER.